United States Patent [19]
Cho

[11] Patent Number: 5,569,981
[45] Date of Patent: Oct. 29, 1996

[54] BALLAST DEVICE FOR COMPACT FLUORESCENT LAMP

[76] Inventor: Sung H. Cho, 100-4 Onsu-Dong, Kuro-Gu, Seoul, Rep. of Korea

[21] Appl. No.: 446,895

[22] Filed: May 17, 1995

Related U.S. Application Data

[63] Continuation-in-part of Ser. No. 251,580, May 31, 1994.

[30] Foreign Application Priority Data

Oct. 11, 1994 [KR] Rep. of Korea .................. 1994-26438

[51] Int. Cl.⁶ .............................. H01J 7/44; H01R 33/08; H05B 41/00
[52] U.S. Cl. ...................... 315/56; 315/58; 313/318.04; 439/602; 439/646; 439/236
[58] Field of Search ................................ 315/58, 61, 62, 315/56; 439/690, 602, 646, 242, 232; 313/318.4

[56] References Cited

U.S. PATENT DOCUMENTS

| | | | |
|---|---|---|---|
| 4,495,443 | 1/1985 | Cummings | 315/58 |
| 4,647,820 | 3/1987 | Chermin et al. | 315/245 |
| 4,761,585 | 8/1988 | Linnman et al. | 315/309 |
| 4,931,696 | 6/1990 | Brower | 315/61 |
| 4,961,027 | 10/1990 | Muessli | 315/58 |
| 5,015,917 | 5/1991 | Nigg | 315/56 |
| 5,164,635 | 11/1992 | De Jong et al. | 315/58 |
| 5,189,339 | 2/1993 | Peshak | 315/58 |
| 5,336,116 | 8/1994 | Boteler | 439/690 |

*Primary Examiner*—Robert Pascal
*Assistant Examiner*—Arnold Kinkead
*Attorney, Agent, or Firm*—Peter L. Michaelson; John C. Pokotylo; Michaelson & Wallace

[57] ABSTRACT

A ballast device for a compact fluorescent lamp, comprises a ballast case including upper case 10-1, a lower case, and PCBs. The upper case has a incandescent lamp base 19 and the lower case has a socket substrate 11 having a compact fluorescent lamp socket. A bottom portion of the upper case is assembled with said lower case having a socket substrate 11. The PCBs includes a first PCB 15 where electronic circuit components 15-2 are mounted on, having a first receiving portion for allowing for the fluorescent lamp socket to be inserted in, and a second PCB 16 where a electronic circuit components 16-2 are mounted, and the mounted components 16-2 having long height are located in center area of the second PCB 16 to be located inside the bulb base 19.

13 Claims, 4 Drawing Sheets

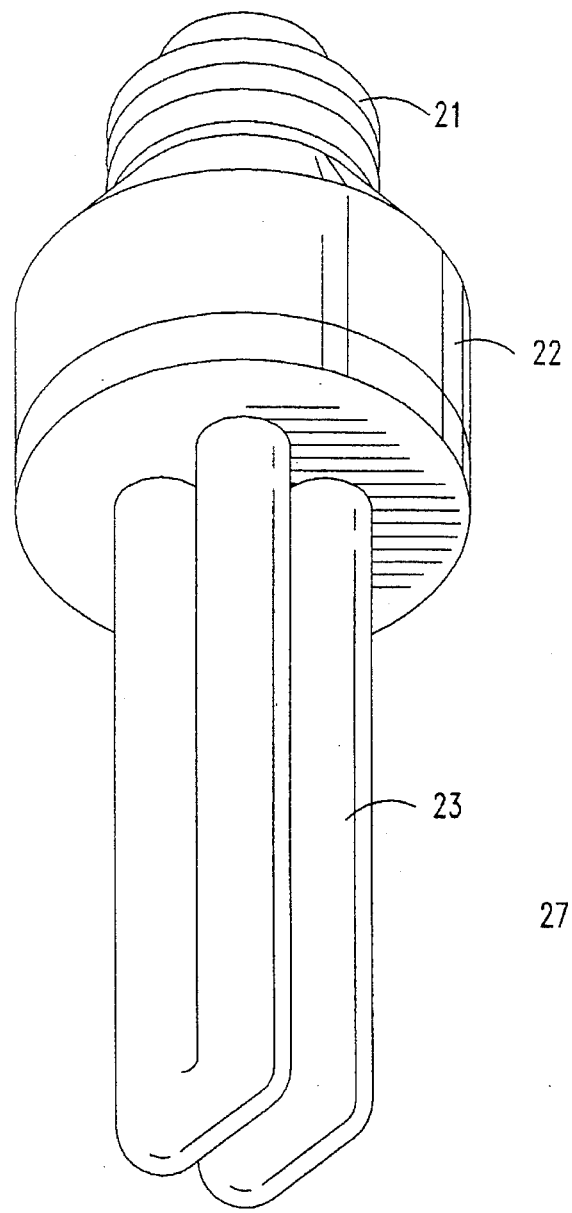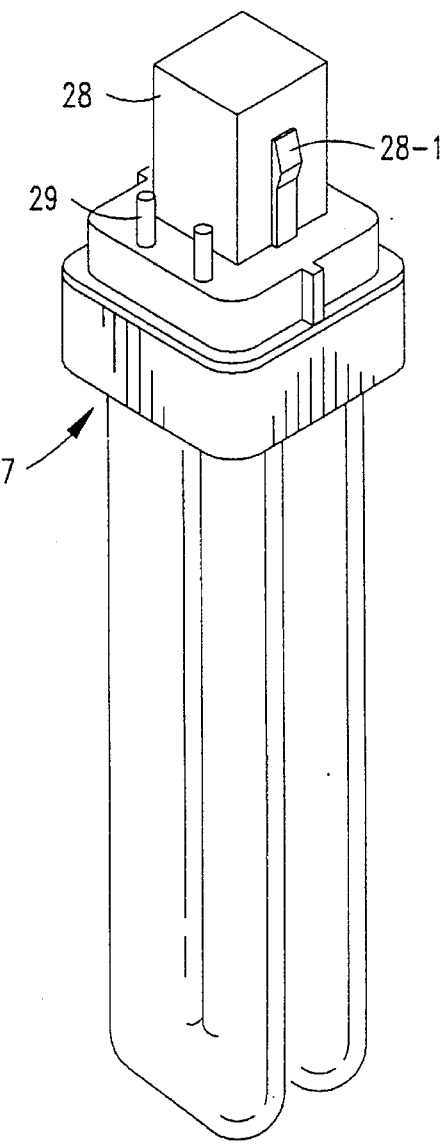
FIG. 1 PRIOR ART
FIG. 2 PRIOR ART 5,569,981

BALLAST DEVICE FOR COMPACT FLUORESCENT LAMP

CROSS-REFERENCE TO RELATED APPLICATION

This application is a continuation-in-part of my co-pending U.S. Patent application Ser. No. 08/251,580 filed May 31, 1994.

FIELD OF THE INVENTION

This invention relates to a compact fluorescent lamp apparatus having a ballast, a socket for accepting the compact fluorescent lamp, and an incandescent lamp base for fitting in to a conventional incandescent lamp socket.

BACKGROUND OF THE INVENTION

A fluorescent lamp (FL) is highly efficient in emitting light. To use the FL lamp instead of a incandescent lamp, the FL lamp is made small. To insert a small fluorescent lamp or the like into a bulb socket of the incandescent lamp the lamp apparatus size, including an electronic ballast, must be further reduced.

FIG. 1 shows a conventional compact fluorescent lamp apparatus having a ballast case 22 without a compact fluorescent lamp socket, a small fluorescent lamp 23 and a bulb base 21, which are integrated in one unit.

Although the lamp apparatus is convenient to use, the integral unit, including both the socket and ballast, must be replaced with a new one when a life of a fluorescent lamp is ended. Thus, the combination ballast and bulb unit wastes material sources i.e., a prefectly usable ballast is discarded when the fluorescent lamp is no longer operational.

A compact fluorescent lamp shown in FIG. 2 has been commercially available. The compact fluorescent lamp has a plug 28 that can be fitted to a socket in a socket-type ballast, and four pins 29 for electric connection.

To use such a compact fluorescent lamp, many types of ballast are produced. One such type of electronic ballast has a socket for accommodating the compact fluorescent lamp plug, 28 and an incandescent bulb base for fitting in to an incandescent bulb socket.

However, further reductions in the it of the conventional electronic ballast having a compact fluorescent lamp socket and a bulb base are needed.

SUMMARY OF THE INVENTION

It is an object of the present invention to provide a ballast device for a compact fluorescent lamp which is compatible with the conventional products with respect to the socket size for both of the bulb base and compact fluorescent lamp plug, and particularly to reduce the size of the ballast case.

The ballast device of the present invention includes a ballast case including an upper case, a lower case, and a printed circuit board(PCB).

The upper case has a conventional incandescent lamp base (bulb base) at its top portion, the lower case has a compact fluorescent lamp socket substrate. A bottom portion of the upper case is adapted to be assembled with the lower case.

The lower case has a compact fluorescent lamp socket. The compact fluorescent lamp socket comprises a socket substrate 51, two pairs of terminals 52, and a socket upper plate 53. The substrate 51 has two pairs of through holes 51-1 for accepting pins of a compact FL lamp, and has a receiving portion 14 of a FL lamp socket plug. The two pairs of terminals 52 are for connecting the pins of the F1 lamp to a ballast circuit. The socket upper plate 53 is provided with receiving cavities 53-1 for receiving top portions 52-1 of the terminals 52.

The PCB has a first receiving portion for allowing the compact fluorescent lamp socket formed in said lower case to be inserted therethrough. Electronic circuit components mounted on the first PCB are disposed around a Side space of the fluorescent lamp socket, and the PCB may have a second receiving portion for allowing a tall electronic component to be inserted therethrough.

The socket upper plate 53 of the socket is assembled with the socket substrate 51 using the coupling means 53-2. The terminals 52 serve as a limiting means for fixing a PCB having electronic components constituting a ballast circuit. A tall electronic component is mounted on inner top portion of a plug receiving portion of a compact fluorescent lamp socket so that the tall component may consume a inner space of the lamp base.

BRIEF DESCRIPTION OF THE DRAWINGS

FIG. 1 is a perspective view showing a conventional ballast device combined with a small fluorescent lamp.

FIG. 2 is a perspective view showing a compact fluorescent lamp.

DETAILED DESCRIPTION OF THE PREFERRED EMBODIMENT

Figure 3:
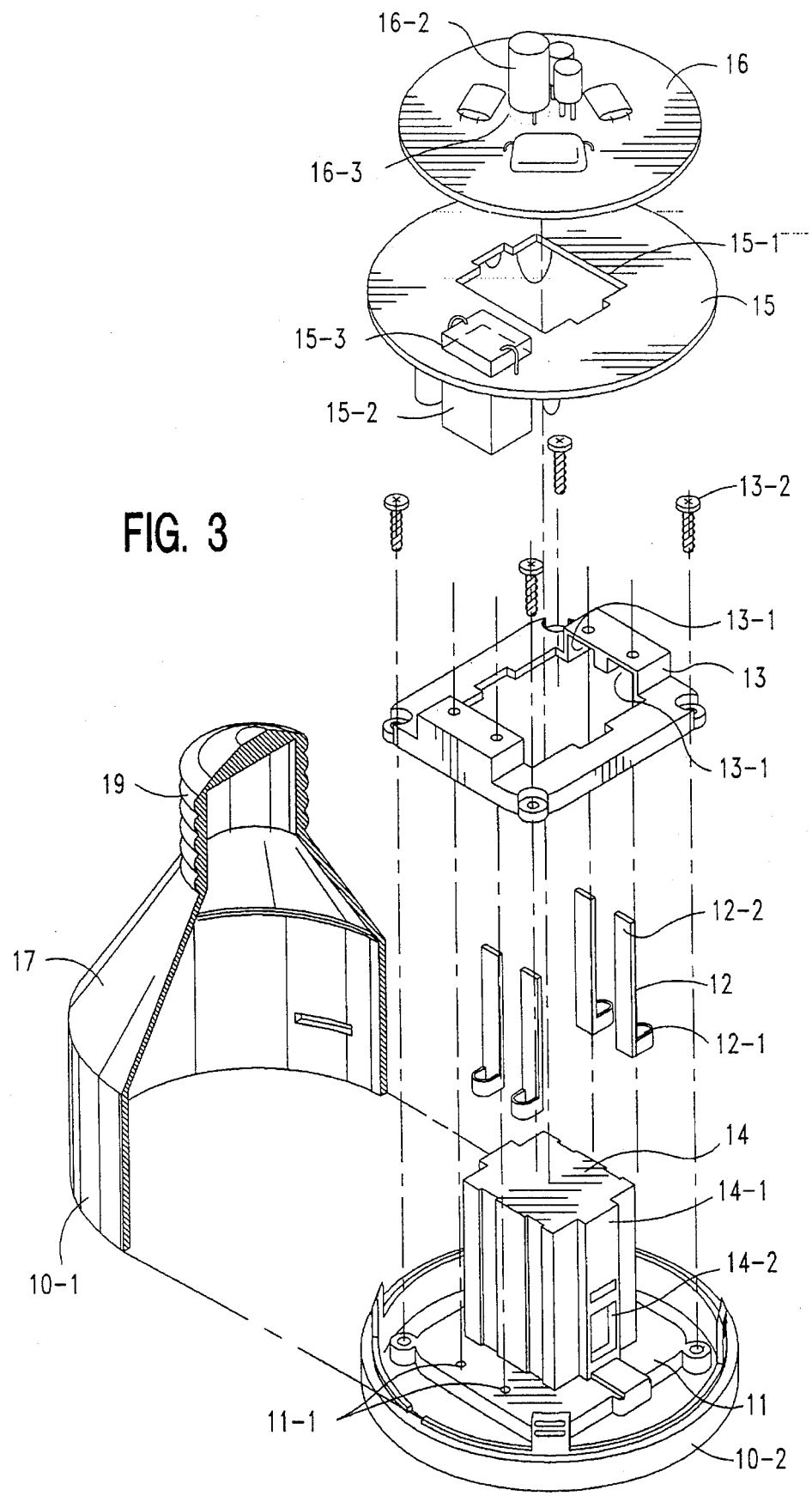
FIG. 3 is a perspective view showing a disassembled ballast device for a compact fluorescent lamp according to the present invention.
Figure 4:
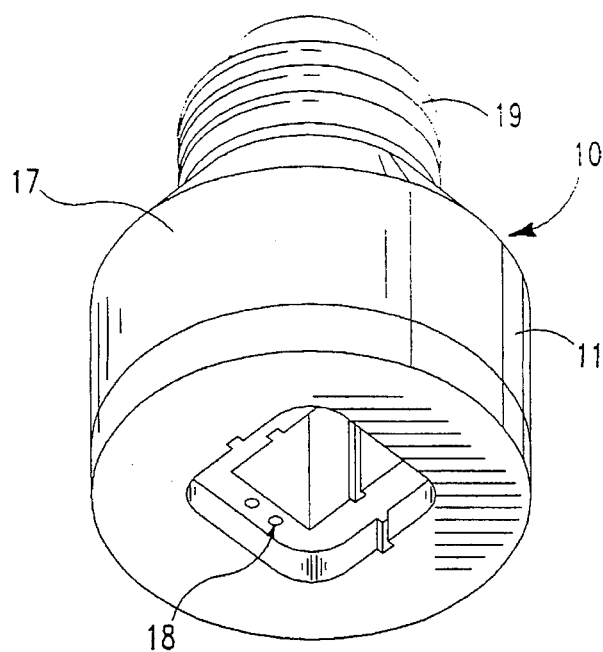
FIG. 4 is a perspective view showing an assembled ballast device according to the present invention.

FIG. 3 shows one embodiment of the present invention.

A ballast device of the present invention includes a ballast case 10 including upper case 10-1 and a lower case 10-2, a first printed circuit board(PCB) 15 and a second PCB 16.

The upper case 10-1 has a conventional incandescent lamp base 19 at its top portion, the lower case 10-2 has a compact fluorescent lamp socket substrate 11. A bottom portion of the upper case 10-1 is adapted to be assembled with the lower case 10-2.

Components constituting the ballast, including its power rectifier, are mounted on Printed Circuit Boards(PCB) having a first PCB 15 on which the electric components are mounted and then disposed on the side surface of a plug receiving portion 14 which receives a plug 28 of a compact lamp 27, and a second PCB 16 on which the components are mounted and then disposed inside a bulb base 19, fully using a space of a ballast case 10.

The first PCB 15 is provided with a component receiving cavity 15-3 or second receiving cavity in a selected area so that an electric component 15-2 of relatively long length mounted can be inserted through one of the selected areas of the first PCB in the case that the length of the electric components are enough to reach an end of the space. To permit the long components to be mounted on PCB, the PCBs may have a plurality of component receiving cavities 15-3.

The first PCB has an opening 15-1 for the plug receiving portion 14 of the lower case 10-2 to be inserted.

The compact fluorescent lamp socket of the lower case 10-2 includes a socket substrate 11 having two pairs of through holes 11-1 for the insertion of pins 29 of compact fluorescent lamp, two pairs of terminals 12 which will contact with pins 29 of the lamp plug inserted into the through holes 11-1, and a socket upper plate 13 which has a receiving cavity 13-1 receiving the top portions of the terminals 12-1 and which is coupled with the substrate 11 (by coupling means), thus locating the terminal top portion 12-1 in desired positions.

Each of a tail 12-2 of the terminal is connected to a terminal on a predetermined position of the first PCB 15 by soldering.

The lower case 10-2 having a socket substrate 11, which constitutes a ballast case 10 with an upper case 10-1, has a plug receiving portion 14 so as to receive the plug 28 shown in FIG. 2 of the compact fluorescent lamp.

Inside the plug receiving portion 14 is installed a locking spring 14-2 which receives and locks a protrusion 28-1 of the plug 28.

The first PCB 15 includes the first receiving cavity 15-1 formed in a center area of the PCB 15 where a top portion 14-1 of the plug receiving portion 14 may be inserted therethrough, and the second receiving cavity 15-3 for receiving the electric component of a relatively long length, such as the condenser, transformer or the like.

The second PCB 16 has a smaller diameter than that of the first PCB 15 and is located at a certain position 17 where the diameter of the upper case 10-1 is decreasing. In the second PCB 16, electronic components 16-2 of a long length are located at a center area of the second PCB 16 such that those components occupy a space inside the bulb base 19. Thus, electronic components having a long length (e.g., 16-2) can be located inside the bulb base 19.

The second PCB 16 also may have the second receiving cavity 16-3 receiving the electric components 16-2 of a long length, such as the condenser, transformer or the like.

When the upper plate 13 of the socket is assembled with the socket substrate 11 using the coupling means, such as the screws 13-2, the tails 12-2 of terminals 12 act as limiting means such that the first PCB 15 cannot move upward. The terminals 12 are made of a conductive material.

The second PCB 16 has a rectifier which receives the power through the power supply lines from the bulb base 19 and is connected to the first PCB 15 by a conductive lead, rod, wire, or the like(not specifically shown).

The electrical wiring connects a pair of power lines from the bulb base 19 to the rectifying means in the second PCB 16 which outputs a rectified DC power connected to the well-known ballast circuit for the fluorescent lamp.

The ballast circuit generates high frequency power and is connected to the FL lamp for lighting the FL lamp by means of the terminals 12.

After the electrical wiring is connected, the upper case 10-1 is assembled with the lower case 10-2, thus completing the assembly of the ballast case 10.

This device can be used by inserting the compact fluorescent lamp 27 into the socket receiving part 14, with the bulb base being inserted into a bulb socket which is already installed on a wall or lamp stand.

With the compatibility with the conventional lamp apparatus with respect to the socket size for both of the bulb base and compact fluorescent lamp, the reduced size of the ballast case will increase the usefulness for the lamp apparatus.

The second PCB 16 has a rectifier which receives the power through the power supply lines from the bulb base 19 and is connected to the first PCB 15 by the conductive line, rod, wire, or the like.

Figure 6:
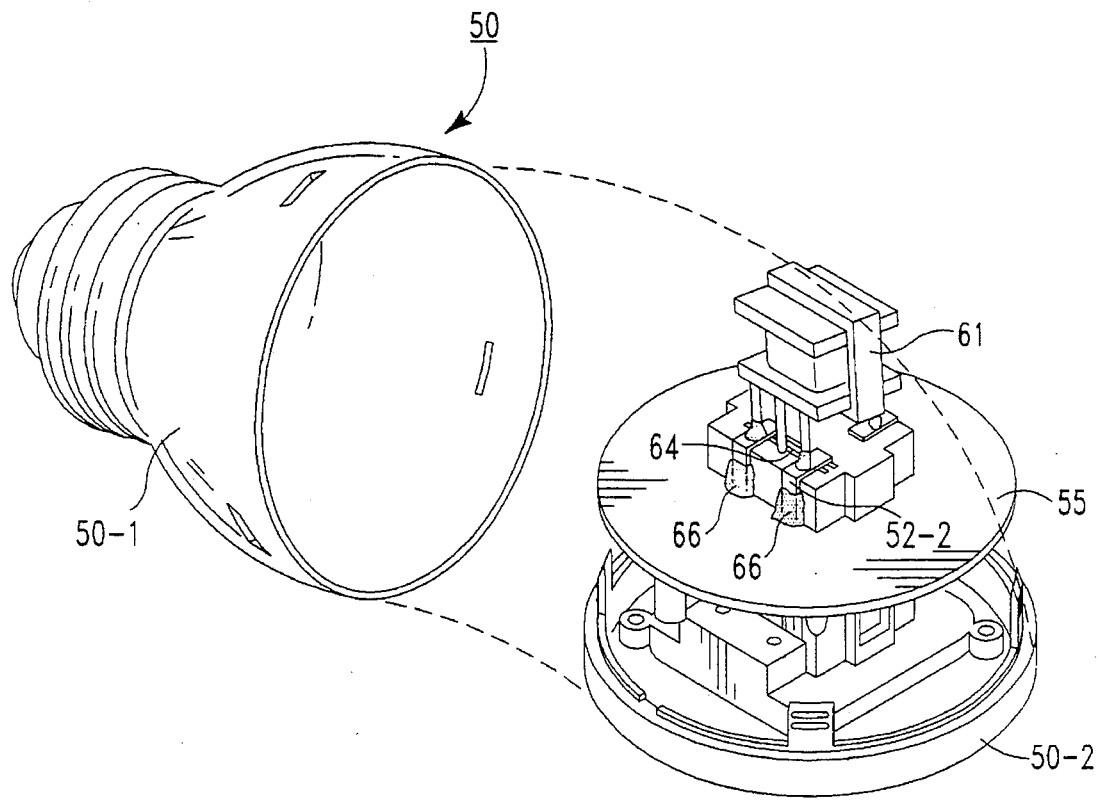
FIG. 6 is a perspective view showing an assembled ballast device of FIG. 5.
Figure 5:
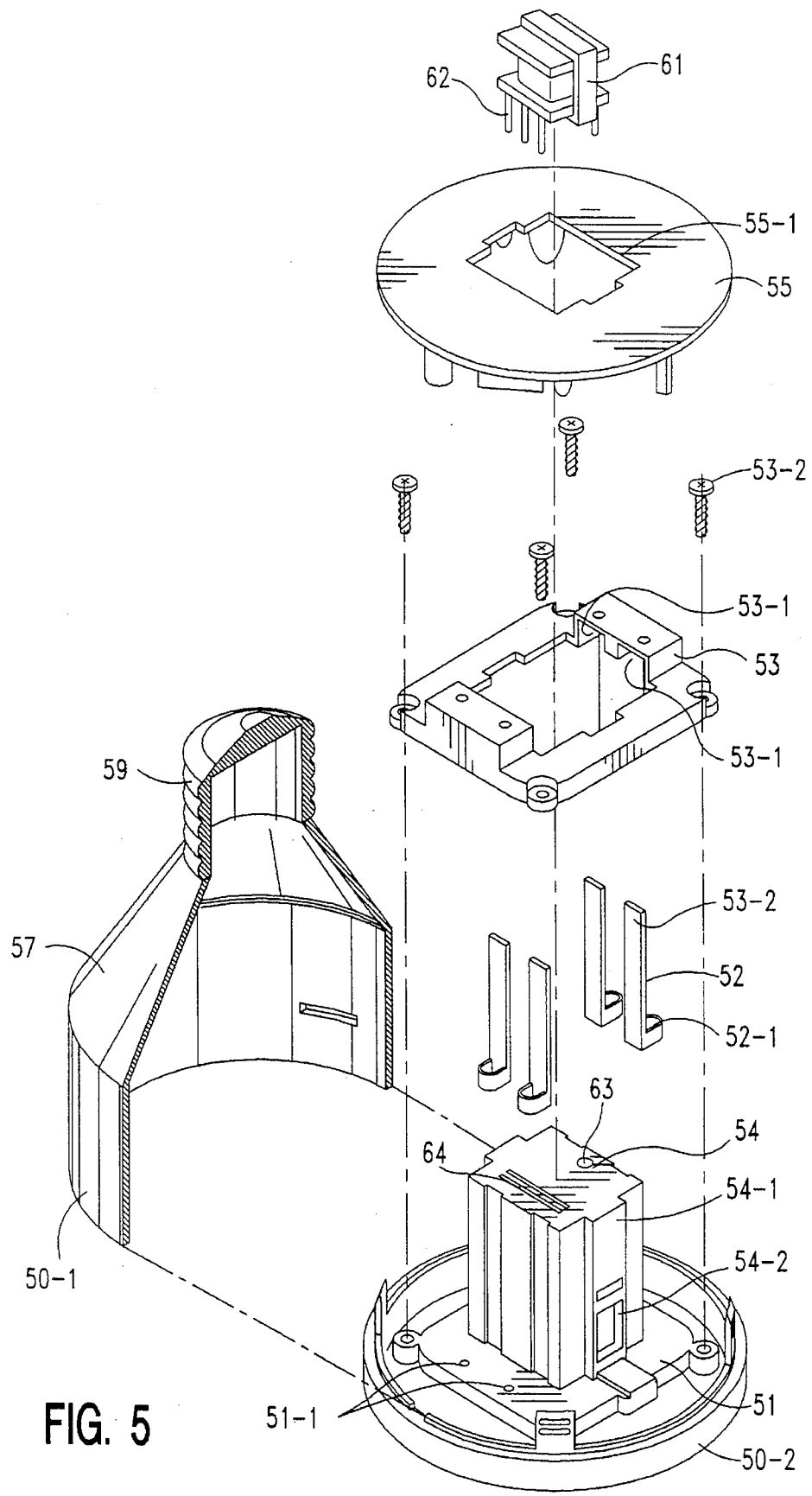
FIG. 5 is a perspective view second embodiment of a disassembled ballast device for a compact fluorescent lamp according to the present invention.

Another embodiment of the present invention is illustrated in FIGS. 1 and 6.

A ballast device of the present invention includes a ballast case 50 including upper case 50-1, a lower case 50-2, and a printed circuit board(PCB) 55.

The upper case 50-1 has a conventional incandescent lamp base 59 at its top portion; the lower case 50-2 has a compact fluorescent lamp socket substrate 51. A bottom portion of the upper case 50-1 is adapted to be assembled with the lower case 50-2.

Electronic components of a electronic ballast circuit are mounted on a Printed Circuit Board (PCB) 55 and on a plug receiving portion 54 of compact FL lamp socket. The electronic components mounted on PCB 55 are disposed on the side surface of a plug receiving portion 54 which receives a plug 28 of a compact FL lamp 27; components mounted on the plug receiving portion 54 are disposed inside a bulb base 59, fully using a space of a ballast case 50.

The PCB has an opening 55-1 for insertion of the plug receiving portion 54.

The lower case 50-2 has a socket substrate 51 and a plug receiving portion 54 which receives the plug 28 shown in FIG. 2.

The compact fluorescent lamp socket formed in the lower case 50-2 includes a socket substrate 51, two pairs of terminals 52, and a socket upper plate 53. The socket substrate 51 has two pairs of through holes 51-1 for insertion of pins 29 of compact fluorescent lamp. The two pars of terminal 52 will contact with pins 29 of the lamp plug. The socket upper plate 53 has receiving cavities 53-1 for receiving the top portion 52-1 of the terminals. The socket upper plate 53 is coupled with the lamp socket substrate 51 by coupling means. When the socket upper plate 53 is coupled with the lamp socket substrate 51, the terminal top portions 52-1 are located in a desired position.

As shown in FIG. 6, a tail 52-2 of each of the terminals 52 is connected to a terminal 66 on a predetermined position of the PCB 55 by means of soldering.

The lower case 50-2 has a plug receiving portion 54, inside of which a locking spring 54-2 is installed for locking the plug 28.

The PCB 55 includes the opening 55-1 formed in center area where a top portion 54-1 of the plug receiving portion 54 may be inserted.

On a top portion of the plug receiving portion 54, an electronic component 61 of a long length is located such that the component 61 consumes a inner space of the bulb base 59. Such component may be a tall condenser, transformer or the like.

When the socket upper plate 53 is assembled with the lamp socket substrate 51 with coupling means, such as the screws 53-2, the tails 52-2 of terminals 52 act a limiting means that prevents the PCB 55 from moving to upward. At the tail 52-2, a lead of the tall component 61 is connected.

FIG. 6 shows a semi-assembled state of the second embodiment of the present invention. For electric wiring, two wires connect the lamp base to certain terminals of the ballast circuit.

The fully assembled device of the present invention may be used similarly as explained above.

What is claimed is:

1. An adapter for receiving a compact fluorescent lamp and fitting into an incandescent socket, the adapter comprising:

a) a socket substrate having a top side and a bottom side, the bottom side having a socket receiving part which defines a cavity having an open end on the top side of the socket substrate for receiving a socket plug of the compact fluorescent lamp, wherein a plurality of holes are defined from the top side to the bottom side of the socket substrate for permitting pins of the compact fluorescent lamp to pass through the socket substrate;

b) a ballast case having an upper portion coupled with a peripheral region of the socket substrate, a bulb base, adapted to fit into the incandescent socket, at its lower portion, and a section arranged between the upper portion of the ballast case and the bulb base of the ballast case;

c) a socket upper plate having a top side coupled with the bottom side of the socket substrate and having a plurality of receiving cavities defined therein, and a bottom side, wherein the socket receiving part of the socket substrate extends through a central receiving cavity formed in the socket upper plate, and wherein a plurality of holes, aligned with the plurality of holes defined in the socket substrate, are defined in the socket upper plate;

d) a plurality of terminals, each of the plurality of terminals having a top portion and a tail, the top portion of each of the plurality of terminals held in a respective one of the receiving cavities of the socket upper plate;

e) an electronic component arranged on a lower surface of the socket receiving portion of the socket substrate, the electronic component including at least one lead electrically coupled with the tail of at least one of the plurality of terminals; and f) a printed circuit board having an upper side adjacent to the lower side of the socket upper plate and having a lower side, wherein the socket receiving part of the socket substrate extends through a central receiving cavity formed in the printed circuit board.

2. The adapter of claim 1 wherein the top portion of each of the plurality of terminals is U-shaped.

3. The adapter of claim 2 wherein the holes defined in the socket substrate, the U-shaped portions of the plurality of terminals, and the holes defined in the socket upper plate are aligned for permitting pins of the fluorescent lamp to pass through.

4. The adapter of claim 3 wherein the plurality of terminals are dimensioned such that they contact the pins of the fluorescent lamp.

5. The adapter of claim 1 wherein the tails of the plurality of terminals are soldered to contacts of the printed circuit board.

6. The adapter of claim 1 wherein, in each of the plurality of terminals, the tail extends from the top portion, through the central receiving cavity formed in the socket upper plate.

7. The adapter of claim 1 wherein the upper side of the printed circuit board includes a first plurality of electronic components mounted thereon.

8. The adapter of claim 7 wherein the electronic component is longer than any one of the first plurality of electronic components.

9. The adapter of claim 1 wherein the electronic component extends beyond the upper portion of the ballast case.

10. The adapter of claim 9 wherein the electronic component extends into the bulb base of the ballast case.

11. The adapter of claim 1 wherein the electronic component is located within the bulb base of the ballast case.

12. The adapter of claim 1 wherein the electronic component is a tall condenser.

13. The adapter of claim 1 wherein the electronic component is a tall transformer.

* * * * *